United States Patent Office 3,462,498
Patented Aug. 19, 1969

3,462,498
PROCESS FOR ISOLATION OF 2,5-DICHLOROPHENOL FROM AN ISOMERIC MIXTURE OF DICHLOROPHENOLS
Wilfrit Lowe, Ingelheim am Rhein, Germany, assignor to C. H. Boehringer Sohn, Ingelheim am Rhein, Germany, a limited-partnership of Germany
No Drawing. Filed Aug. 31, 1966, Ser. No. 576,245
Claims priority, application Germany, Sept. 10, 1965, B 83,681
Int. Cl. C07c *39/30*
U.S. Cl. 260—623
3 Claims

ABSTRACT OF THE DISCLOSURE

A process for isolating 2,5-dichlorophenol from a mixture consisting essentially of 2,4- and 2,5- or 2,4-, 2,5- and 3,4-dichlorophenol is disclosed, which comprises heating said mixture to a temperature above 85° C. and below the decomposition temperature of urea, together with an amount of urea corresponding to at least one mol-equivalent based on the 2,5- and 3,4-dichlorophenol content of said mixture and no more than two mol-equivalents based on the total number of mols of dichlorophenol isomers contained in said mixture, to form a 2,5-dichlorophenol-urea adduct or a mixture of 2,5- and 3,4-dichlorophenol-urea adducts, respectively, cooling the reaction mixture to the temperature at which the crystallization of the 2,5-dichlorophenol-urea adduct begins, adding an inert organic solvent having a boiling point substantially above 85° C. to prevent the 2,4-dichlorophenol-urea adduct from precipitating out and allowing the mixture to cool to room temperature, separating the precipitated dichlorophenol-urea adducts and hydrolyzing them by heating them with water to a temperature of about 70 to 80° C., and recovering 2,5-dichlorophenol from the hydrolyzate.

---

This invention relates to a process whereby 2,5-dichlorophenol may be isolated from a mixture consisting of at least 2,4- and 2,5-dichlorophenol isomers.

2,5-dichlorophenol has acquired significant importance as a starting material for the preparation of insecticides and other pest control agents, but no economically feasible method has been devised for isolating this important compound in substantially pure form from one of its cheapest sources.

A mixture of dichlorophenol isomers may be easily and relatively inexpensively obtained by alkaline hydrolysis under pressure of 1,2,4-trichlorobenzene, which itself is readily accessible by the method described in Beilstein V, 204, for instance. The alkaline hydrolysis yields a mixture consisting essentially of 2,4-, 2,5- and 3,4-dichlorophenol isomers (see U.S. Patent 2,799,714 and C.A. 52, 2070/71). The 3,4-dichlorophenol isomer may easily be separated from the other isomers by distillation, making use of the relatively large difference between the boiling points of the 3,4-isomer (B.P. 130–132° C. at 12 mm. Hg) on the one hand and the 2,4- and 2,5-isomers (B.P. of both 90° C. at 12 mm. Hg) on the other hand. However, no industrially acceptable process for separation of the remaining 2,4- and 2,5-isomer mixture has heretofore been known.

The primary object of the present invention, therefore, is to provide a process for effectively separating 2,5-dichlorophenol from a mixture consisting essentially of 2,5-dichlorophenol and 2,4-dichlorophenol by economically feasible and industrially acceptable means.

A further object of the invention is to provide a process for virtually quantitative separation of 2,5-dichlorophenol from its 2,4-isomer.

Another object of the instant invention is to provide a process for recovery of 2,5-dichlorophenol, free from other dichlorophenol isomers, from a mixture consisting essentially of 2,5-dichlorophenol and its 2,4-isomer, or of 2,5-, 2,4- and 3,4-dichlorophenol.

Other objects and advantages of the present invention will become apparent as the description thereof proceeds.

The above objects are attained in accordance with the instant invention by virtue of the surprising discovery that the separation may effectively and economically be achieved by way of the urea-adducts of the dichlorophenol isomers.

More particularly, I have discovered that the isomer separation may be achieved by melting an isomeric mixture consisting essentially of 2,4- and 2,5-dichlorophenol and heating it to a temperature above 85° C. but below the decomposition temperature of the urea, admixing the molten mixture with urea in an amount of at least one mol equivalent based on the number of mols of 2,5-dichlorophenol in the isomeric mixture and no more than two mol equivalents based on the total number of mols of dichlorophenol isomers in the isomeric mixture, preferably from 1 to 1.5 mol equivalents of urea based on the total number of mols of dichlorophenol isomers in the isomeric mixture, and allowing the resulting urea-dichlorophenol adduct mixture to cool. When the adduct mixture reaches a temperature of about 105° C. in the course of cooling, only the 2,5-dichlorophenol-urea adduct crystallizes out, whereas the 2,4 - dichlorophenol-urea adduct does not begin to precipitate out until the temperature of the adduct mixture reaches about 85° C.

Actually, it is immaterial whether the urea is added to the isomeric dichlorophenol mixture before or after the latter is heated; in other words, the urea may be added first and the resulting mixture may thereafter be melted and heated to the required temperature as set forth above.

The precipitation of the 2,4-dichlorophenol-urea adduct beginning at about 85° C. may be altogether prevented by cooling the mixture before and after it reaches 85° C., in the presence of an inert organic solvent having a boiling point substantially above 85° C. and preferably above 105° C., such as toluene, ligroin (petroleum ethers of medium boiling point range) or a xylene. The 2,4-dichlorophenol thereby remains in solution while the 2,5-dichlorophenol-urea adduct remains undissolved.

Again, it is immaterial at what point in the process the solvent is added, so long as it is present just before and continuously after the cooling mixture passes the critical temperature of 85° C. Thus, the solvent may be added together with the urea, or the solvent may be added first and the urea later.

Another very advantageous embodiment of the process according to the present invention comprises adding only one molar equivalent of urea based on the number of mols of 2,5-dichlorophenol in the isomeric dichlorophenol mixture. Under these conditions only the 2,5-isomer forms a urea adduct, so that the inert organic solvent needed for extraction of the 2,4-dichlorophenol may be added after the urea adduct mixture has passed 85° C. in the course of cooling.

The amount of 2,5-dichlorophenol in the isomeric mixture consisting essentially of 2,5-dichlorophenol and its 2,4-isomer may easily be determined by a number of different known methods, such as by gas chromatography.

The formation of the urea adducts proceeds practically quantitatively. In those instances where the separation is carried out in the presence of an inert organic solvent, however, a minor portion of the 2,5-dichlorophenol-urea adduct goes into solution in the solvent, so that upon isolation of the undissolved 2,5-dichlorophenol-urea adduct, the yield of this adduct is only about 86% of the theoretical yield. However, the solvent used in one batch may be used over again for subsequent batches without removing the dissolved dichlorophenol-urea adducts therefrom; therefore, the yield of 2,5-dichlorophenol-urea adduct in the next subsequent batch already rises to 95% of the theoretical yield.

Another advantage of the process according to the present invention is that it is not necessary to start with absolutely pure 1,2,4-trichlorobenzene in order to produce the isomeric dichlorophenol mixture by alkaline hydrolysis under pressure. Instead, it is entirely adequate to start with technical grade 1,2,4-trichlorobenzene, which contains about 5% of 1,2,3-trichlorobenzene. Alkaline hydrolysis of this technical grade starting compound produces an isomeric mixture consisting largely of 2,5-dichlorophenol and its 3,4- and 2,4-isomer, and minor amounts of 2,3-dichlorophenol as well as 2,6-dichlorophenol.

The 3,4- and 2,6-isomer may easily be separated by fractional distillation before the urea treatment, and the 2,3-isomer is nearly quantitatively separated together with the 2,4-isomer by the solvent procedure described above. In other words, even if the trichlorobenzene starting material is of technical grade instead of chemically pure, the process according to the present invention still produces 2,5-dichlorophenol practically free from other dichlorophenol isomers.

The above mentioned hydrolysis product can also be used as starting material without preceding fractional distillation. In that case the amount of urea must be based on the number of mols of 2,5- and 3,4-dichlorophenol. By treating the isomeric mixture with urea as described above the 2,5- and 3,4-isomer urea adduct are separated together. The cleavage of the adducts is accomplished as described below and the 2,5- and 3,4-isomer urea adduct are separated by distillation.

The cleavage of the 2,5-dichlorophenol-urea adduct into 2,5-dichlorophenol and urea may be accomplished in simple fashion and with quantitative yields by heating the 2,5-dichlorophenol-urea adduct in water at about 70–80° C., whereby the 2,5-dichlorophenol separates out and the urea goes into solution. The dichlorophenol may be separated from the urea solution by mechanical means, such as a separator funnel, or by extraction with a suitable solvent, such as toluene. The urea may be recovered by evaporating the aqueous solution.

The separation of isomeric mixtures by means of urea adduct formation as such is known and has previously been applied to other types of isomeric compounds in the phenol class. For instance, German Patent 541,037 describes a method for separating m-cresol from p-cresol by urea adduct formation. However, this prior art process did not suggest the process according to the present invention, inasmuch as it is not possible to separate other dichlorophenol isomers, such as 2,6- or 3,4-dichlorophenol, from 2,5-dichlorophenol by urea adduct formation.

The following examples further illustrate the present invention and will enable others skilled in the art to understand it more completely. It should be understood, however, that the invention is not limited solely to the embodiment illustrated in these examples.

EXAMPLE 1

370 gm. (2.04 mols) of technical grade 1,2,4-trichlorobenzene, consisting of 96% 1,2,4-trichlorobenzene and 4% 1,2,3-trichlorobenzene, were hydrolyzed with methanolic sodium hydroxide in an autoclave pursuant to U.S. Patent 2,799,714, and the raw isomeric dichlorophenol mixture formed thereby was isolated. The yield was 315 gm.

The isomeric dichlorophenol mixture thus obtained was distilled in a distillation column under an aspirator vacuum. The fraction passing over at 89–91° C./12 mm. Hg was collected; it weighed 257 gm. and consisted of 82.6% 2,5-dichlorophenol and the balance mostly 2,4-dichlorophenol with a very small amount of 2,3-dichlorophenol.

The isomeric dichlorophenol fraction thus collected was heated on an oil bath to an internal temperature of 110° C., whereupon 78 gm. (one molar equivalent based on the 2,5-dichlorophenol content) of urea were added while stirring, and the oil bath was removed. Crystallization of the 2,5-dichlorophenol-urea adduct began as soon as the reaction solution had cooled to 105° C. After the reaction mixture had further cooled to just below 100° C., 400 cc. of toluene were added, and the mixture was allowed to cool to room temperature. Thereafter, the reaction mixture was vacuum filtered. The filtrate contained all of the 2,4-dichlorophenol as well as a very small amount of 2,3-dichlorophenol.

The filter cake was heated for thirty minutes at 70–80° C. in 500 cc. of water, whereby 2,5-dichlorophenol separated out. The 2,5-dichlorophenol was separated from the supernatant aqueous urea solution by extraction with toluene. The toluene was distilled out of the extract solution, leaving as a residue 183 gm. of pure 2,5-dichlorophenol, M.P. 55° C. The yield was 55% of theory based on the technical grade 1,2,4-trichlorobenzene starting material, and 86% of theory based on the 2,5-dichlorophenol content of the collected distillation fraction.

EXAMPLE 2

465 gm. of technical grade dichlorophenol, consisting of 70% of 2,5-dichlorophenol, 20% of 3,4-dichlorophenol and 10% of 2,4-dichlorophenol were heated on an oil bath to an internal temperature of 110° C., whereupon 154 gm. (one molar equivalent based on the 2,5- and 3,4-dichlorophenol content) of urea were added while stirring. As soon as the urea was dissolved, the oil bath was removed. After crystallization of the urea adducts had begun, 700 cc. of toluene were added, the reaction mixture was allowed to cool to 20° C. Thereafter, the reaction mixture was vacuum filtered. The filter cake was heated for thirty minutes at 70–80° C. in 1000 cc. of water, the mixture extracted with toluene and the toluene distilled off. The residue consisting of 222 gm. of a mixture of 2,5-, 3,4-dichlorophenol was distilled in a distillation column under an aspirator vacuum. The fraction passing over at 89–91° C./12 mm. Hg was collected; yield 193 gm. of 2,5-dichlorophenol, M.P. 54° C. (59.6% based on the 2,5-dichlorophenol content of the starting material).

While the present invention has been illustrated with the aid of two specific embodiments thereof, it will be readily apparent to others skilled in the art that my invention is not limited to these particular embodiments, and that various changes and modifications may be made without departing from the spirit of the invention or the scope of the appended claims.

I claim:

1. The process of isolating 2,5-dichlorophenol from a mixture consisting essentially of 2,4- and 2,5- or 2,4-, 2,5- and 3,4-dichlorophenol, which comprises heating said mixture to a temperature above 85° C. but below the decomposition temperature of urea, together with an amount of urea corresponding to at least one mol-equivalent based on the 2,5- and 3,4-dichlorophenol content of said mixture and no more than two mol-equivalents based on the total number of mols of dichlorophenol isomers contained in said mixture, to form a 2,5-dichlorophenol-urea adduct or a mixture of 2,5- and 3,4-dichlorophenol-urea adducts, respectively, cooling the reaction mixture to the temperature at which crystallization of the 2,5-dichlorophenol-urea adduct begins, adding an inert organic solvent selected from the group consisting of toluene, xylene and ligroin having a boiling point substantially above 85° C. to prevent the 2,4-dichlorophenol-urea adduct from precipitating out and allowing the mixture to cool to room temperature, separating the precipitated dichlorophenol-urea adducts and hydrolyzing them by heating them with water to a temperature of about 70 to 80° C., and recovering 2,5-dichlorophenol from the hydrolyzate.

2. The process according to claim 1, wherein said adduct formation as well as the crystallization and separation are carried out in the presence of said inert organic solvent.

3. The process according to claim 2, wherein said organic solvent is toluene.

References Cited
UNITED STATES PATENTS

| | | |
|---|---|---|
| 1,830,859 | 11/1931 | Schotte et al. |
| 2,586,070 | 2/1952 | Luten et al. |
| 2,708,209 | 5/1955 | Nicolaisen et al. |

BERNARD HELFIN, Primary Examiner

W. B. LONE, Assistant Examiner

U.S. Cl. X.R.

260—96.5